United States Patent
Cheng et al.

(10) Patent No.: US 7,837,959 B2
(45) Date of Patent: Nov. 23, 2010

(54) SYNERGISTIC SOLVENT EXTRACTION PROCESS

(75) Inventors: Chu Yong Cheng, South Lake (AU); Mark Daniel Urbani, Wattle Grove (AU)

(73) Assignee: Commonwealth Scientific and Industrial Research Organisation, Campbell ACT (AU)

( * ) Notice: Subject to any disclaimer, the term of this patent is extended or adjusted under 35 U.S.C. 154(b) by 403 days.

(21) Appl. No.: 11/663,681

(22) PCT Filed: Sep. 23, 2005

(86) PCT No.: PCT/AU2005/001452

§ 371 (c)(1),
(2), (4) Date: Nov. 20, 2007

(87) PCT Pub. No.: WO2006/032097

PCT Pub. Date: Mar. 30, 2006

(65) Prior Publication Data

US 2008/0245734 A1    Oct. 9, 2008

(30) Foreign Application Priority Data

Sep. 24, 2004    (AU) .............................. 2004905512

(51) Int. Cl.
*B01D 11/00*    (2006.01)
(52) U.S. Cl. ...................... 423/24; 423/99; 423/139; 423/122; 423/140; 210/634; 210/639
(58) Field of Classification Search .................... 423/24, 423/99, 139, 122, 140; 210/634, 639
See application file for complete search history.

(56) References Cited

U.S. PATENT DOCUMENTS

| | | | |
|---|---|---|---|
| 5,470,553 A * | 11/1995 | Hao-Chung et al. | 423/139 |
| 6,210,647 B1 | 4/2001 | Virnig et al. | |
| 7,157,003 B2 | 1/2007 | Baron et al. | |
| 2002/0012621 A1 * | 1/2002 | Jones | 423/139 |

FOREIGN PATENT DOCUMENTS

| | | |
|---|---|---|
| JP | 06-264156 | 9/1994 |
| JP | 08-092665 | 4/1996 |
| JP | 2004-307983 | 11/2004 |
| KR | 9407372 | 8/1994 |

OTHER PUBLICATIONS

Cheng, Purification of synthetic laterite leach solution by solvent extraction using D2EHPA, Mar. 21, 2000, Hydrometallurgy, 56, 369-386.*

* cited by examiner

*Primary Examiner*—Steven Bos
*Assistant Examiner*—Pritesh Darji
(74) *Attorney, Agent, or Firm*—Merchant & Gould P.C.

(57) ABSTRACT

A process for separating one or more metal ions forming a first group of metal ions such as copper, zinc and ferric ions, from one or more other metal ions forming a second group of metal ions such as cobalt and nickel, comprising:

contacting an aqueous solution comprising said first and second groups of metal ions with an organic solution comprising a phosphinic acid and a hydroxyoxime to extract one of said groups of metal ions into the organic phase, and separating the organic and aqueous phases.

20 Claims, 3 Drawing Sheets

SYNERGISTIC SOLVENT EXTRACTION PROCESS

The present invention relates to a synergistic solvent extraction process for separating one group of metal ions from a second group of metal ions. The process is suitable for separating copper and/or zinc and/or ferric iron from cobalt and/or nickel contained in an aqueous solution. The process is also suitable for separating any one of these metal ions from any others, alone or in combination.

The world mineral industry is experiencing an unprecedented interest in metal extraction from laterite and sulphide ores through hydrometallurgical processes. Commonly, the hydrometallurgical process involves grinding, leaching and solvent extraction (SX), with recovery of product via precipitation or reduction processes. The intensity of the leaching process (temperature, pressure, bio) depends on the nature of the ore (mineralogy, grade), the distribution of the metal(s) to be recovered and the particle size reduction achieved during grinding. Leach solutions often contain copper, nickel, cobalt and zinc (and/or manganese) as metals to be recovered (target metals), with calcium, magnesium, iron and aluminium (and manganese if not be to be recovered) as impurity metals to be rejected. Iron (as ferric) and aluminium are often removed by precipitation at low pH (pH 2.5-5.0) prior to SX.

A separation of industrial significance that has proven to be particularly troublesome is the separation of copper and/or zinc and/or ferric iron from cobalt and/or nickel. Nickel and cobalt are often the metals of greatest value in leach solutions.

Traditionally, sulphide or hydroxide precipitation followed by re-leach processes have been used by industry to separate copper, zinc, nickel and cobalt (the so-called targeted or valuable metals), from the impurities iron, aluminium, manganese calcium and magnesium.

More recently, solvent extraction processes have been proposed to effect the separation of some targeted metals from impurities.

Regardless of the process used to separate the targeted metals from the impurities to form a partially-purified and concentrated leach solution, the issue of separating the targeted metals from each other, and in particular, separating copper and zinc from cobalt and nickel, remains a significant and troublesome industrial problem.

Traditionally, various combinations of precipitation, ion exchange and solvent extraction have been used by industry to separate copper, zinc, nickel and cobalt from each other, resulting in quite complicated flow sheets with many individual process steps. Alternatively, mixed metal products (of lower value) have been produced for subsequent separation and refining.

It is desirable to identify new solvent extraction solutions that are capable of spreading out the pH isotherms for metal ions, so that new processes and flow sheets can be developed that enable the extraction of selected metals from an aqueous solution containing a range of metal ions, such as an aqueous leach solution.

It is therefore an object of the invention to provide alternative processes for:

Separating groups of metal ions from other groups of metal ions using new solvent extraction techniques, including Separating copper and/or zinc and/or ferric iron from cobalt and/or nickel, and Separating any one or more of these ions from any other ions in this group.

SUMMARY OF THE INVENTION

The present invention is generally based on the development of an organic solution of phosphinic acid and hydroxyoxime which is effective in shifting the pH isotherms of metal ions in such a way as to enable separation of certain groups of these metal ions (elements) from each other.

The organic solution is effective in shifting the pH isotherms of nickel, cobalt, copper, zinc, and ferric iron in a beneficial manner. In particular, the isotherms of the elements copper, zinc, and ferric iron are separated from the isotherms of cobalt and nickel to allow effective separation of these groups of elements. Further, the isotherms of the individual metals, copper, ferric iron, zinc, cobalt and nickel can be sufficiently separated from each other to allow effective separation of these elements (individually, or in particular combinations) from each other.

Thus, when this organic extractant solution is contacted with certain leach solutions containing appropriate levels of elements, and in appropriate pH conditions (as can be identified from the pH isotherms), it becomes possible to separate (and optionally thereafter recover) copper, iron, zinc, cobalt and nickel.

According to the present invention there is provided a process for the extraction of one or more metal ions from an aqueous solution, comprising the step of subjecting the aqueous solution to solvent extraction using a mixture of a phosphinic acid and a hydroxyoxime.

In other terms, the present invention provides a process for separating one or more metal ions forming a first group of metal ions, from one or more other metal ions forming a second group of metal ions, comprising:

contacting an aqueous solution comprising said first and second groups of metal ions with an organic solution comprising a phosphinic acid and a hydroxyoxime to extract one of said groups of metal ions into the organic phase, and separating the organic and aqueous phases.

One of the groups of metals, either the first group or the second group, reports to the organic phase, with the other of the groups of metal ions remaining in the aqueous phase. After separation of the organic and aqueous phases, these phases can be subjected to further processing, depending on the metal ion content therein, or the metal ions can be recovered therefrom.

Preferably, the aqueous solution comprises at least two metal ions selected from copper, zinc, ferric iron, cobalt and nickel, and the first group of metal ions comprises one or more of these ions, and the second group comprises one or more different ions from the aqueous solution.

As foreshadowed above, the solvent extraction mixture of phosphinic acid and hydroxyoxime is particularly good at shifting the pH isotherms of the metals such that the pH isotherms for cobalt and nickel are reasonably separated from those of copper, zinc and ferric iron, thereby enabling the separation of these elements from each other, to the extent that they are present in an aqueous solution. Accordingly, in one embodiment of the invention, the first group comprises one or more ions selected from copper, zinc and ferric ions, and the second group comprises cobalt and/or nickel.

Within this embodiment, the first group of ions is generally extracted into the organic phase. Thereafter the copper and/or zinc and/or ferric iron may be recovered from this phase, and the cobalt and/or nickel recovered from the aqueous phase—generally known as the raffinate.

According to another embodiment, depending on the elements present in an aqueous solution, by selection of the appropriate pH conditions, phosphinic acid and hydroxyoxime, the solvent extraction mixture can be used to separate other groups of elements from one another, such as copper from ferric iron, zinc from ferric iron, and so forth. Generally, according to this embodiment, the first group comprises one metal ion selected from copper, zinc and ferric iron, and the second group comprises one or both of the metal ions not present in the first group, selected from copper, zinc and ferric iron.

According to another embodiment, the first group comprises cobalt, and the second group comprises nickel.

The aqueous solution may suitably be a leach solution that has been subjected to preliminary process steps, such as preliminary solvent extraction stages, partial purification and/or concentration (in any suitable order). The leach solution may be one containing low levels of aluminium, manganese, calcium, magnesium and ferrous iron. The leach solution may in certain embodiments be one that contains high levels of nickel and cobalt.

BRIEF DESCRIPTION OF THE DRAWINGS

The invention will be described in further detail with reference to the following figures which relate to preferred embodiments of the invention.

DETAILED DESCRIPTION OF THE INVENTION

Figure 1:
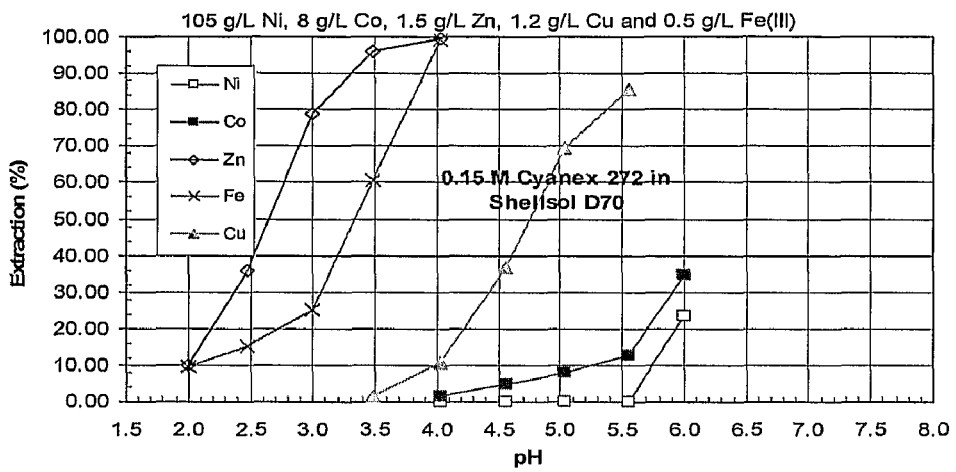
FIG. 1 is a graph of the extraction pH isotherms for metals using the phosphinic acid Cyanex 272 in Shellsol D70.
Figure 2:
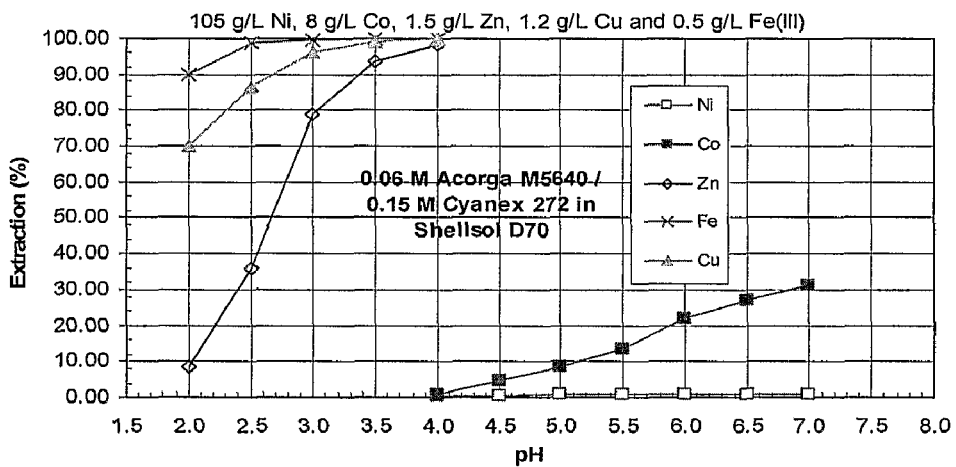
FIG. 2 is a graph of the extraction pH isotherms for metals using the hydroxyoxime Acorga M5640 with the phosphinic acid Cyanex 272 in Shellsol D70.

At the core of the present invention is a new synergistic solvent extraction mixture. The solvent extraction mixture comprises a combination of phosphinic acid and hydroxyoxime synergist. This synergistic solvent extraction mixture is capable of separating particular groups of metals from one another that have historically been difficult to separate. As an example of this, a synergistic solvent extraction step using this new mixture effects extraction of a large proportion of the copper, zinc and ferric iron into an organic phase (to the extent that these elements are present), with a large proportion of the cobalt and nickel being rejected to the aqueous phase. Depending on the pH selected, however, the metals can report to either the organic phase or the aqueous phase, as is chosen for a particular aqueous leach solution.

The synergistic solvent extraction mixture of phosphinic acid with hydroxyoxime offers particular advantages over solvent extractions with either agent used alone. For example, it is generally difficult to separate copper and cobalt using phosphinic acid reagents; similarly, it is generally difficult to separate zinc from cobalt using hydroxyoximes. The mixture of phosphinic acid with hydroxyoxime can readily separate copper, zinc (and ferric iron) from cobalt (and nickel).

It will be appreciated by those skilled in the art that the effective separation of the metals nickel, cobalt, copper, zinc and ferric iron by solvent extraction using a mixture of phosphinic acid and hydroxyoxime, and the position of the metals' pH isotherms, will depend in part upon:

the composition of the aqueous leach solution from which the metals are to be separated, in terms of both the elements present and the (relative) concentrations of the elements present, and the composition of the organic extractant mixture in terms of both the chemical structures of the phosphinic acid and hydroxyoxime present and the (relative) concentrations of the phosphinic acid and hydroxyoxime present.

This is discussed in further detail below.

Phosphinic Acid

In the most preferred embodiment of the invention, the phosphinic acid is di-2,4,4-trimethylpentyl phosphinic acid (eg Cyanex 272). However it will be appreciated by persons skilled in the art that any phosphinic acid having extraction characteristics similar to di-2,4,4-trimethylpentyl phosphinic acid could be used. Phosphinic acids (specifically organophosphinic acids) have the formula $R_2PO_2H$, in which R represents an organic group. The two organic groups R, which may be the same or different, can be selected from optionally substituted branched, straight chained or cyclic alkyl, alkenyl or alkynyl groups. Preferably the organic groups are fairly bulky, and have a minimum of 4 carbon atoms, more preferably from 4 to 18 carbon atoms. The organic groups are preferably unsubstituted branched, straight chained or cyclic alkyl groups, and may suitably be n-octyl, cyclooctyl, 2-ethylhexyl or 2,4,4-trimethylpentyl.

The term "alkyl" used either alone or in a compound word such as "optionally substituted alkyl" or "optionally substituted cycloalkyl" denotes straight chain, branched or mono- or poly-cyclic alkyl, preferably C1-30 alkyl or cycloalkyl. Examples of straight chain and branched alkyl include methyl, ethyl, propyl, isopropyl, butyl, isbutyl, sec-butyl, tert-butyl, amyl, isoamyl, sec-amyl, 1,2-dimethylpropyl, 1,1-dimethylpropyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, nonyl, 1-, 2-, 3-, 4-, 5-, 6- or 7-methyloctyl, 1-, 2-, 3-, 4- or 5-ethylheptyl, 1-2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include cyclopropyl, cyclobutyl, cyclopentyl, cyclohexyl, cycloheptyl, cyclooctyl, cyclononyl and cyclodecyl and the like. The alkyl may optionally be substituted by any non-deleterious substituent.

In this specification "optionally substituted" means that a group may or may not be further substituted with one or more groups selected from alkyl, alkenyl, alkynyl, aryl, halo, haloalkyl, haloalkenyl, haloalkynyl, haloaryl, hydroxy, alkoxy, alkenyloxy, aryloxy, benzyloxy, haloalkoxy, haloalkenyloxy, haloaryloxy, nitro, nitroalkyl, nitroalkenyl, nitroalkynyl, nitroaryl, nitroheterocyclyl, amino, alkylamino, dialkylamino, alkenylamino, alkynylamino, arylamino, diarylamino, benzylamino, dibenzylamino, acyl, alkenylacyl, alkynylacyl, arylacyl, acylamino, diacylamino, acyloxy, alkylsulphonyloxy, arylsulphenyloxy, heterocyclyl, heterocycloxy, heterocyclamino, haloheterocyclyl, alkylsulphenyl, arylsulphenyl, carboalkoxy, carboaryloxy, mercapto, alkylthio, benzylthio, acylthio and the like.

Suitable optional substituents will be chosen on the basis that the organophosphinic acid have the desired extraction characteristics, and the substituents do not react with any other component of the mixture under the given extraction conditions.

Hydroxyoxime

A hydroxyoxime is used as a synergist with the phosphinic acid in the solvent extraction step. A hydroxyoxime is a compound containing an oxime group and a hydroxy group. Preferably, the groups are in an α-position with respect to each other. Such α-hydroxyoximes are chelating, whereas oximes are generally non-chelating and thus behave differently. The "oxime" functional group contains a carbon to nitrogen double bond, with the nitrogen atom being attached to an oxygen atom. Accordingly, the term oxime includes within its scope oximes with a hydroxy group attached to the nitrogen atom, and oxime ethers, although hydroxime (>C═N—OH) is preferred. The hydroxyoxime may be a C8-C26 hydroxyoxime. The hydroxyoxime may be an aliphatic hydroxyoxime or an aromatic hydroxyoxime.

Preferably, the hydroxyoxime is of one or a mixture of hydroxyoximes of formulae (I) and/or (II):

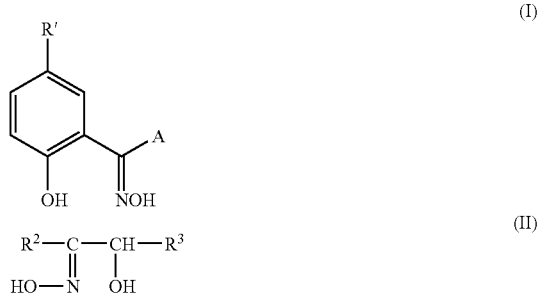

in which A is selected from a hydrogen atom, a methyl group or an optionally substituted, straight chain, branched or cyclic alkyl or aryl group containing from 2 to 15 carbon atoms. Preferably A is a hydrogen atom or a methyl group. $R^1$, $R^2$ and $R^3$ are each selected from an optionally substituted, straight chain, branched or cyclic alkyl or aryl group containing from 2 to 15 carbon atoms. Preferably each of $R^1$, $R^2$ and $R^3$ are unsubstituted alkyl groups, most preferably a heptyl, nonyl or dodecyl group. Examples of such compounds are 5,8-diethyl-7-hydroxy-6-dodecanone oxime (the active component of a commercial agent LIX 63), 5-nonylsalicylaldoxime (the active component of Acorga M5640), 5-dodecylsalicylaldoxime (the active component of LIX 860) and 2-hydroxy-5-nonylacetophenone (the active component of LIX 84). These have the following structures:

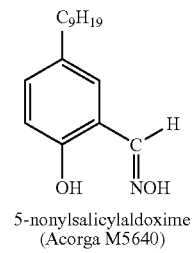
5-nonylsalicylaldoxime
(Acorga M5640)

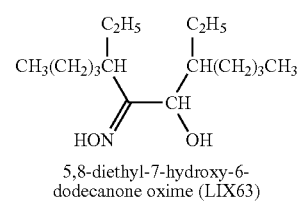
5,8-diethyl-7-hydroxy-6-dodecanone oxime (LIX63)

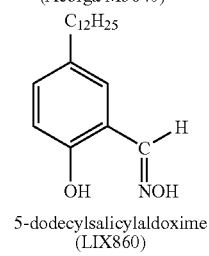
5-dodecylsalicylaldoxime
(LIX860)

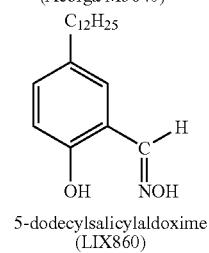
2-hydroxy-5-nonylacetophenone oxime
(LIX84)

The hydroxyoxime synergist is suitably one that is capable of increasing the pH gap, $\Delta pH_{50}$, between isotherms for copper, zinc and ferric iron and those for cobalt and nickel. This results in advantageous selectivity of copper, zinc and ferric iron, over cobalt and nickel, the latter metals usually being those of most value in the (partially-purified and concentrated) leach solution.

The $pH_{50}$ value is the pH at which 50% metal extraction is achieved. Thus, $\Delta pH_{50}$ is the difference between the $pH_{50}$ values for two metals, or the difference between the $pH_{50}$ values for the same metal under different extraction conditions.

Leach Solution

The aqueous solution is preferably a leach solution. The aqueous (leach) solution subjected to the synergistic solvent extraction with phosphinic acid and hydroxyoxime is preferably any type of leach solution containing at least two elements selected from copper, zinc, ferric iron, cobalt and nickel. According to one embodiment, it contains at least three of, and suitably all of the elements copper, zinc, ferric iron, cobalt and nickel.

According to one embodiment, the leach solution may contain the following levels of elements:
Ni: 0-200 g/L
Co: 0-50 g/L
Cu: 0-50 g/L
Zn: 0-50 g/L
Fe(III): 0-50 g/L, with the proviso that the solution contains at least two of the elements, preferably at a level of at least 0.5 g/L.

The leach solution is suitably one that is partially-purified and concentrated. The leach solution may for instance be a solution obtained from releaching a mixed hydroxide or sulphide precipitate, isolated after the pressure acid leaching of any suitable ore type, such as a laterite or sulphide ore. Otherwise, the leach solution may be a leach solution that has been subjected to previous solvent extraction stages.

Leach solutions often contain copper, nickel, cobalt and zinc as metals to be recovered (target metals), with calcium, magnesium, iron, aluminium and manganese as impurity metals to be rejected. Iron (as ferric) and aluminium are often removed by precipitation at low pH (pH 2.5-5.0) prior to further purification and concentration steps.

Sulphide or hydroxide precipitation followed by re-leach processes have been used by industry to separate copper, zinc, nickel and cobalt (the targeted or valuable metals), from the impurities iron, aluminium, manganese, calcium and magnesium. More recently, solvent extraction processes have been proposed to effect the separation of targeted metals from impurities.

The initial leach solution may be obtained by pressure acid leaching of any suitable ore type, such as a laterite or sulphide ore. It may alternatively be a solution from bio-leach, atmospheric acid leach, oxidative leach, reductive leach, chloride leach or any combination of these leach processes. The steps involved in producing such leach solutions are well known in the art.

The (partially-purified and concentrated) leach solution is preferably a solution that has been subjected to
1. a preliminary iron and/or aluminium precipitation step to precipitate out iron and/or aluminium to leave an aqueous leach solution containing the target elements and
2. a purification and concentration step to remove impurity elements such as manganese, calcium and magnesium, and to concentrate the target metals copper, zinc, cobalt and nickel.

The leach solution may alternatively or further have been subjected to one or more additional treatment or processing stages.

Extent of Extraction of Metal Ions into Organic Phase

It will be understood to those skilled in the art of the invention that it is desirable to extract a significant or commercially acceptable level of the chosen metal ions (eg. ions from the first group) into the organic phase, to the substantial exclusion of other chosen metals (i.e. ions from the second group). There is not usually absolute extraction of all metal ions being extracted into the organic phase, to the complete exclusion of other metal ions, and therefore this is to be taken into consideration in reading this specification. The actual level of separation can be predicted using the pH isotherm graphs for a given system. Generally, the level of extraction of the metal ions of one group into the organic phase will be at a level of above 80%, with not more than 20% co-extraction of the metal ions from the other group.

The term "group" in the context of a group of metal ions is to be read as encompassing a single species of metal ion, in addition to multiple (two or more) species of metal ions.

Synergistic Solvent Extraction Conditions

The solvent extraction step involves contacting an organic solvent containing the phosphinic acid and hydroxyoxime with the (aqueous) leach solution. This is followed by phase separation of the aqueous and organic phases. The organic solvent may be any suitable organic solvent known in the art. Kerosene is the most common solvent/diluent used for this purpose due to its low cost and availability. Shellsol D70 is one specific example.

The amount of phosphinic acid and hydroxyoxime in the organic solution used in the solvent extraction step will depend on the concentration of the copper, zinc and ferric iron (and optionally cobalt and nickel) to be extracted and the A/O (aqueous/organic) flow rate ratio. The concentration would typically be in the range of from 0.05 to 2.0 M for phosphinic acid, with a preferred range of 0.1 to 1.0M, and 0.01 to 1.0 M for hydroxyoxime.

To effect the separation of copper, zinc and ferric iron as a group from cobalt and nickel as a group, the pH of the aqueous phase is preferably maintained in a range from 3.5 to 6.0. However those skilled in the art will appreciate that this range may vary depending on the exact composition of the aqueous and organic solutions (see the Examples below, with particular reference to FIGS. 1-6).

For separating each of copper, zinc, ferric iron, cobalt and nickel individually from each other, sequential extraction steps (followed by appropriate stripping steps), at progressively higher pH values may be used. Again, those skilled in the art will appreciate that the optimum pH values for effecting these separations will depend on the exact composition of the aqueous and organic solutions (see FIGS. 1-6)

The temperature is preferably maintained in the range of from 10° C. to 60° C., more preferably from 20 to 40° C. Whilst temperatures as low as 10° C. are achievable, a temperature lower than 15° C. results in high viscosity. At temperatures higher than 60° C. there is a risk of evaporation and degradation of the organic phase.

The aqueous to organic ratio (A/O) in the extraction step is most suitably 1:1, but may lie in the range from 10:1 to 1:10, and preferably 1:5 to 5:1. The aqueous to organic ratio maintained in the scrubbing step may lie within the range from 1:5 to 1:200, but preferably it is in the range of 1:5 to 1:20.

Scrubbing

The organic phase from the synergistic extraction step of the invention is suitably subjected to scrubbing. The scrub solution may suitably be a process stream recycled from the process, and is preferably derived from an aqueous stream of a stripping stage (which may be a selective stripping stage) following the scrubbing stage.

Recovery of Copper, Zinc, Cobalt and Nickel

There are a number of options envisaged by the applicants for the recovery of copper, zinc, cobalt and nickel. Different steps would be used for different leach solutions containing different levels of elements, or when other elements are desired to be recovered or removed.

Selective Stripping to Separate Target Metals

According to one embodiment of the invention, the organic phase containing targeted metals is subjected to selective stripping to separate to a significant extent the various metals contained therein. Selective stripping is a term of the art, and is used to refer to the stripping of selected metals from the organic phase, without stripping other metals also present in the organic phase. The selective strip suitably involves contacting the organic phase from the synergistic extraction with an acidic aqueous solution to yield (a) a loaded aqueous strip liquor containing the most readily stripped metal (usually the metal with the highest $pH_{50}$) and (b) a selectively stripped organic solution containing the remaining metals present in the organic phase from the synergistic extraction.

The acidic aqueous solution for the selective strip is suitably sulphuric acid solution, although other aqueous acid solutions known in the art (such as hydrochloric) may be used. The pH of the acidic aqueous solution is kept in a suitable range to effect optimal separation. This range will depend on the composition of the loaded organic solution (reagent and metal concentrations).

The combination of the described synergistic extraction with the selective strip is a very useful combination, enabling the recovery of more than one metal using only one solvent extraction circuit (although more than one circuit could be used if so desired with other process steps).

According to one embodiment, the elements copper and/or zinc and/or ferric iron extracted into the organic phase during solvent extraction are recovered therefrom, and cobalt and/or nickel are recovered from the aqueous raffinate. Where the organic phase of the extraction step contains primarily copper or zinc or ferric iron alone, the recovery step may comprise bulk stripping of the element from the organic phase. Bulk stripping is a term of the art referring to the stripping of all metal ions present in the phase. The bulk stripping may optionally be combined with ion exchange to remove any minor amounts of "impurity" elements.

In the situation where the leach solution contains copper, zinc and/or ferric iron, the recovery step may comprise selective stripping and bulk stripping of the organic phase to separate the copper, zinc and ferric iron from each other.

According to further embodiments, depending on the exact compositions of both the aqueous solution (from which the elements are to be extracted) and the organic extracting phase, the elements may be separated by sequential extraction steps (followed by appropriate stripping steps), at progressively higher pH values.

According to even further embodiments, depending on the exact compositions of both the aqueous solution (from which the elements are to be extracted) and the organic extracting phase, the elements may be separated by a bulk extraction step followed by appropriate selective stripping steps at progressively lower pH values.

Other embodiments include any combination of sequential extraction and/or selective stripping steps to effect separation of the elements into groups or individual metals.

Other Process Details

The synergistic extraction step of the present invention may be combined with different preliminary and subsequent process steps for the development of processes suitable for the recovery of copper, zinc, cobalt and nickel when different impurity elements may be present. It is noted that ferric iron is not typically recovered, as it is generally a low value impurity.

It will be well understood to persons skilled in the art of the invention that scrubbing stages of the type well known in the art may be used for recovering elements even if the scrubbing stages are not specifically mentioned. The design of the optimum arrangement of scrubbing stages will depend on the specific aqueous leach solution and the elements desired to be recovered therefrom (and target percentage recovery levels).

EXAMPLES

The present invention will now be described in further detail with reference to the following examples which demonstrate the underlying theory behind the invention, and how the invention is put into practice.

Batch Test Work

Example 1

Extraction pH Isotherms of Metals with Cyanex 272 and Cyanex 272/Acorga M5640, Cyanex 272/LIX860 and Cyanex 272/LIX63 Synergistic Systems This example illustrates that when the phosphinic acid Cyanex 272 is used as the extractant, the pH isotherms of Cu and Co are too close to allow effective separation of these elements. This is illustrated in FIG. 1. However when Cyanex 272 is used as the extractant with the hydroxyoxime synergists Acorga M5640 (FIG. 2), LIX860 (FIG. 3) or LIX63 (FIG. 4), the pH isotherms of the elements Cu, Zn and Fe(III) as a group are sufficiently separated from those of Co and Ni to allow effective separation. Further, the order and spacing of the pH isotherms of the elements Cu, Zn and Fe(III) are dependent on the chemical nature of the synergist.

In this example, the aqueous solution was a synthetic solution to simulate a typical partially-purified and concentrated laterite leach solution containing 105 g/L Ni, 8 g/L Co, 1.5 g/L Zn, 1.2 g/L Cu and 0.5 g/L Fe(III).

The metal extraction pH isotherms with 0.15 M Cyanex 272 (phosphinic acid) alone, and with 0.15 M Cyanex and 0.06 M synergist (hydroxyoxime) in Shellsol D70 were determined and plotted, as shown in FIGS. 1-4. Comparison of the four plots reveals that the combination of Cyanex 272 (phosphinic acid) with synergist (hydroxyoxime) resulted in significant extraction isotherm shifts that widened the gap between the group of elements comprising Cu, Zn and Fe(III), and the group comprising Co and Ni. The combination of Cyanex 272 with each of the synergists Acorga M5640, LIX860 or LIX63, results in a large separation between the pH isotherms of the elements Cu, Zn and Fe(III) as a group and those of Co and Ni, allowing effective separation of these groups. The order and spacing of the pH isotherms of the elements Cu, Zn and Fe(III) are dependent on the chemical nature of the synergist, but in general, indicate that by judicial choice of synergist and pH, separation of these individual elements is possible.

$pH_{50}$ of Metals from pH Isotherms in FIGS. 1, 2, 3 and 4

| | 0.15M Cyanex 272 | | | |
|---|---|---|---|---|
| Metal | No hydroxyoxime | 0.06M Acorga M5640 | 0.06M LIX860 | 0.06M LIX63 |
| Ni | NA(>Co) | NA(>Co) | NA(>Co) | NA(>Co) |
| Co | ~6.2 | >6.5 | >6.5 | >6.5 |
| Cu | 4.7 | ~1.7 | ~1.5 | 4.4 |
| Zn | 2.7 | 2.7 | 2.5 | 3.3 |
| Fe(III) | 3.3 | <1.5 | 3.4 | ~2.1 |

NA(>Co) = not available, higher than Co

Example 2

Figure 4:
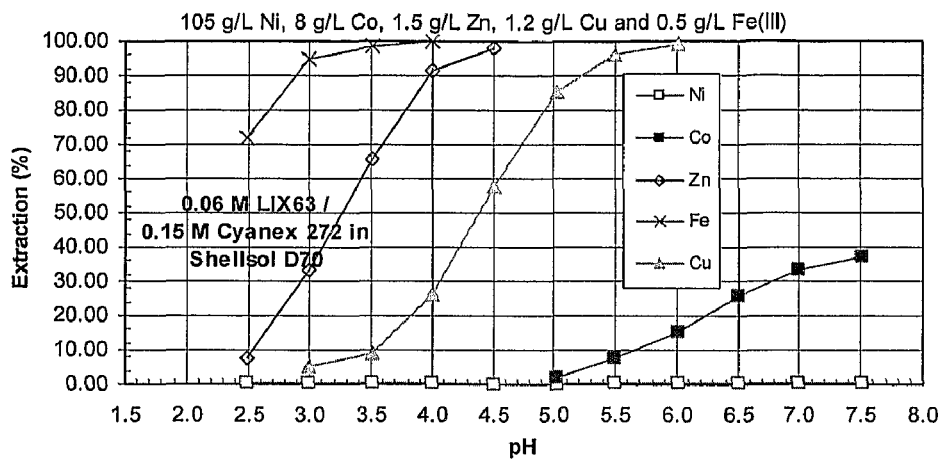
FIG. 4 is a graph of the extraction pH isotherms for metals using the hydroxyoxime LIX63 with the phosphinic acid Cyanex 272 in Shellsol D70.
Figure 5:
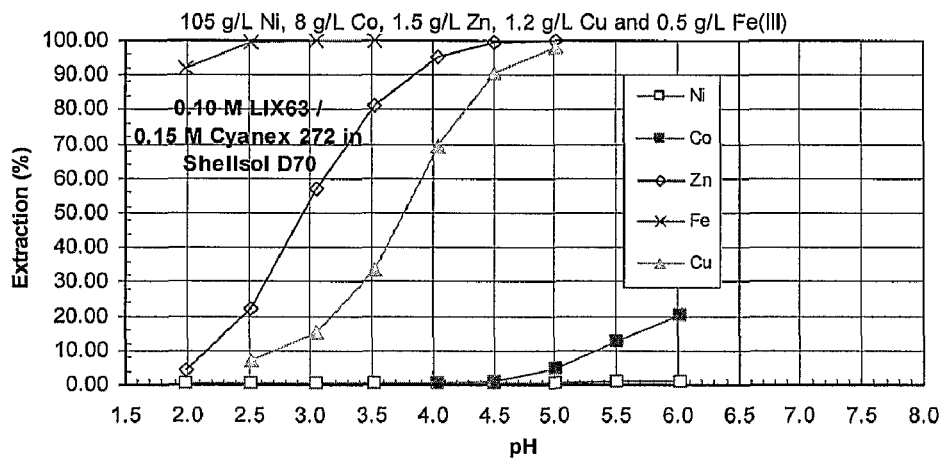
FIG. 5 is a graph of the extraction pH isotherms for metals using a higher concentration of hydroxyoxime LIX63 with the phosphinic acid Cyanex 272 in Shellsol D70, as compared with FIG. 4.

Extraction pH Isotherms of Metals with the Cyanex 272/LIX63 Synergistic System (FIGS. 4 and 5).

This example illustrates how the position of pH isotherms of metals using the hydroxyoxime LIX 63, with the phosphinic acid, Cyanex 272, can be influenced by organic reagent concentration, for the same stated aqueous solution as that used in example 1. The plots show that varying the concentration of the hydroxyoxime LIX 63 from 0.06M (FIG. 4) to 0.10M (FIG. 5), while keeping the concentration of Cyanex 272 constant at 0.15M, causes significant shifts in the positions of the pH isotherms. The pH isotherms for Fe(III), Zn and Cu are all shifted to lower pH with increasing LIX63 concentration. This provides for even better separation of a first group of metal ions (ferric iron, zinc and copper) from a second group (nickel and cobalt).

$pH_{50}$ of Metals from pH Isotherms in FIGS. 4 and 5

|  | 0.15M Cyanex 272 | |
| --- | --- | --- |
| Metal | 0.06M LIX63 | 0.010M LIX63 |
| Ni | NA(>Co) | NA(>Co) |
| Co | >6.5 | >6.5 |
| Cu | 4.4 | 3.7 |
| Zn | 3.3 | 2.9 |
| Fe(III) | ~2.1 | <1.5 |

NA(>Co) = not available, higher than Co

Example 3

Figure 3:
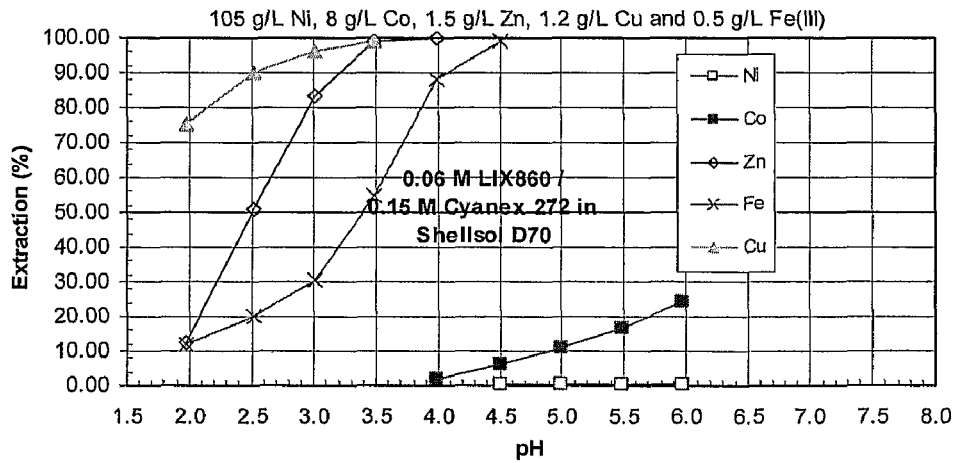
FIG. 3 is a graph of the extraction pH isotherms for metals using the hydroxyoxime LIX860 with the phosphinic acid Cyanex 272 in Shellsol D70.
Figure 6:
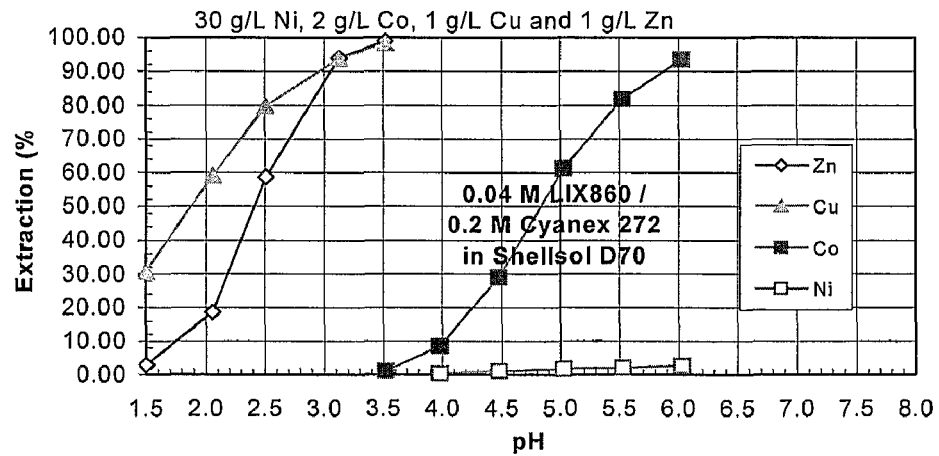
FIG. 6 is a graph of the extraction pH isotherms for a different aqueous solution of metals using a different concentration of hydroxyoxime LIX860 and phosphinic acid Cyanex 272 in Shellsol D70, as compared with FIG. 3.

Extraction pH Isotherms of Metals with the Cyanex 272/LIX860 Synergistic System (FIGS. 3 and 6).

This example illustrates how pH isotherms of metals using the hydroxyoxime LIX 860, with the phosphinic acid, Cyanex 272 can be influenced by organic and aqueous phase compositions.

$pH_{50}$ of Metals from pH Isotherms in FIGS. 3 and 6

|  | System 1 | | System 2 | |
| --- | --- | --- | --- | --- |
| Metal | Aqueous solution (g/L) | 0.06M LIX860 0.15M Cyanex 272 | Aqueous solution (g/L) | 0.04M LIX860 0.20M Cyanex 272 |
| Ni | 105 | NA(>Co) | 30 | NA(>Co) |
| Co | 8 | >6.5 | 2 | 4.8 |
| Cu | 1.2 | ~1.5 | 1 | 1.8 |
| Zn | 1.5 | 2.5 | 1 | 2.4 |
| Fe(III) | 0.5 | 3.4 | 0 | NA |

NA(>Co) = not available, higher than Co

Example 4

Figure 7:
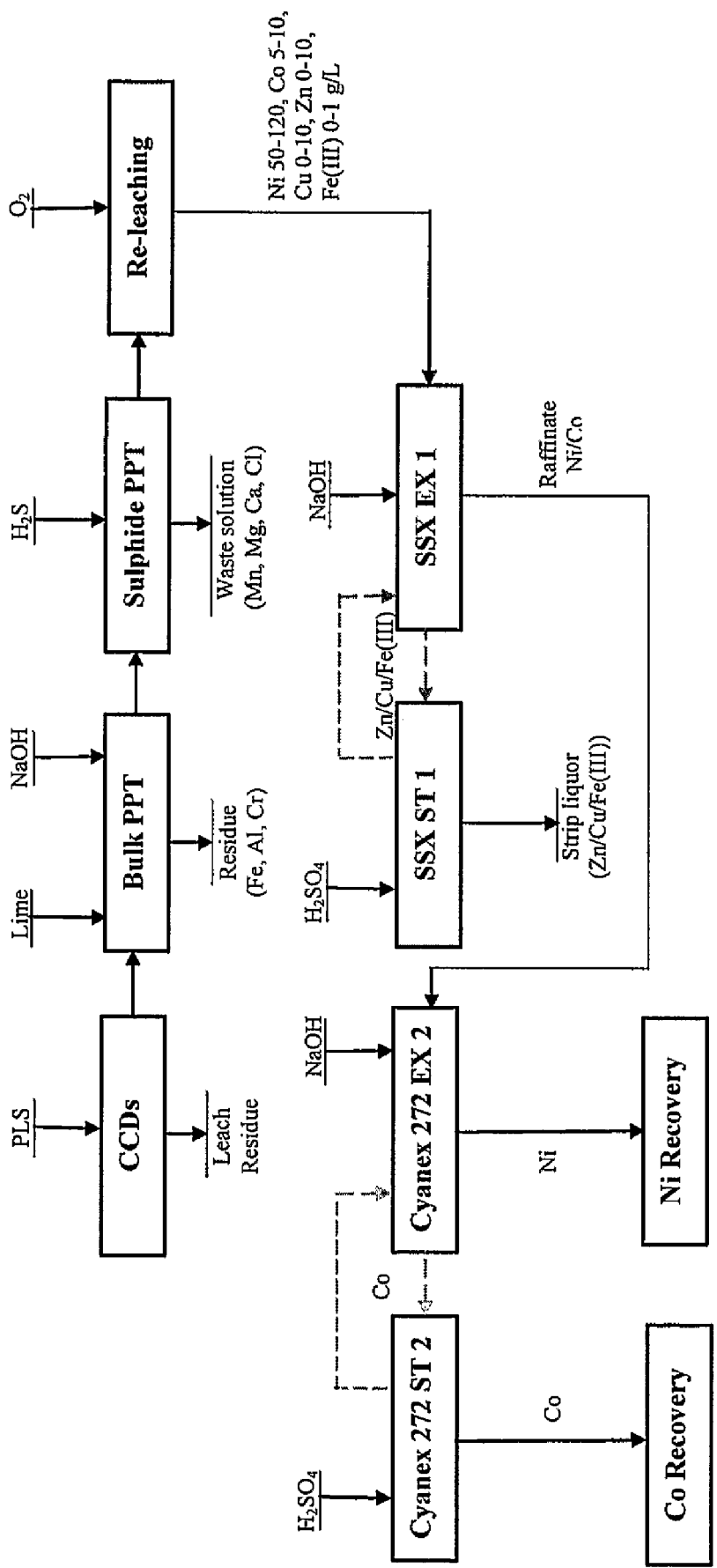
FIG. 7 is a schematic flow chart of the steps of a process of one embodiment of the invention.

Based on the above findings, a new synergistic solvent extraction (SSX) process flow sheet was designed. The flow sheet is shown in FIG. 7.

Leach Solution

The leach solution ("PLS"—plant leach solution) contains nickel, cobalt, iron, aluminium, chromium, manganese, magnesion, calcium, copper and zinc.

Counter Current Decantation (CCDs)

The plant leach solution is initially in the form of a leach slurry and is subjected to solid-liquid separation via settlers (CCD's) in a CCD circuit. The settler over-flow is a clarified leach solution that is fed to the next stage of the process.

Bulk Precipitation (Bulk PPT)

The leach solution is subjected to preliminary neutralisation with limestone at pH 4.5-5.0 to precipitate impurity elements Fe (III), Al and Cr.

Sulphide Precipitation (Sulphide PPT)

Neutralised leach solution is subjected to sulphide precipitation. In this step, the leach solution is contacted with hydrogen sulphide gas to precipitate mixed nickel/cobalt sulphides. The precipitate further contains copper, zinc and iron as sulphide precipitates. The precipitated product is collected using standard techniques known in the art.

Releaching

The precipitate is re-leached through oxidation of the precipitate. The iron content is oxidised to ferric iron. The releached leach solution generally contains 50-120 g/L Ni, 5-10 g/L Co, 0-10 g/L Cu, 0-10 g/L Zn and 0-1 g/L Fe(III).

Synergist Solvent Extraction (SSX EX)

In the synergistic solvent extraction step, an organic solution of phosphinic acid (Cyanex 272) and a hydroxyoxime (LIX 63) in organic-diluent Shellsol D70 is contacted with the leach solution, to which sodium hydroxide is added to achieve the desired pH, to obtain (a) an aqueous raffinate containing nickel and cobalt, and (b) a loaded organic solution containing almost all of the zinc, copper and ferric iron, and only minor levels of cobalt and nickel.

Stripping (SSX ST1)

The loaded organic solution is stripped with sulphuric acid solution to strip zinc, copper and ferric iron therefrom. The stripped organic phase is recycled to SSX EX1.

Cyanex 272 Extraction (EX2)

The aqueous raffinate containing nickel and cobalt is subjected to a second stage of extraction using Cyanex 272. Sodium hydroxide is added to set the appropriate pH to effect separation of the nickel into the aqueous raffinate, and cobalt into the loaded organic phase. The aqueous phase is sent to nickel recovery where the nickel is recovered by any technique known in the art.

Stripping (ST2)

Stripping is conducted on the Cyanex 272 loaded organic phase containing cobalt. A sulphuric acid solution is added to strip cobalt into the aqueous phase. The stripped organic phase is recycled to the Cyanex 272 extraction stage. The strip liquor containing cobalt is sent to cobalt recovery, where the cobalt is recovered by any technique known in the art.

It will be understood to persons skilled in the art of the invention that many modifications may be made without departing from the spirit and scope of the invention.

The claims defining the invention are as follows:

1. A process for separating a first group of metal ions, from a second group of metal ions, the first group of metal ions comprising one or more ions selected from the group consisting of copper, zinc, and ferric ions, and the second group of metal ions comprising one or more ions selected from the group consisting of cobalt, nickel, and combinations thereof, the process comprising:

contacting an aqueous solution comprising said first and second groups of metal ions with an organic solution comprising a phosphinic acid and a hydroxyoxime to extract the first group of metal ions into the organic phase, leaving the second group of metal ions in the aqueous phase, and separating the organic and aqueous phases.

2. The process of claim 1, wherein the aqueous solution is a leach solution.

3. The process of claim 2, wherein the leach solution comprises the following levels of elements:

Ni: 0-200 g/L
   Co: 0-50 g/L
   Cu: 0-50 g/L
   Zn: 0-50 g/L
   Fe(III): 0-50 g/L, with the proviso that the solution contains at least two of these elements.

4. The process of claim 3, wherein at least two of the elements present in the leach solution are at a level of at least 0.5 g/L.

5. The process of claim 2, wherein leach solution is a solution that has been subjected to a preliminary iron precipitation step to precipitate out iron.

6. The process of claim 2, wherein the leach solution is a solution that has been subjected to a purification and concentration step to remove impurity elements manganese, calcium and magnesium.

7. The process of claim 1, wherein the pH of the aqueous phase is maintained in a range from 3.5 to 6.0 when the aqueous solution is contacted with the organic solution.

8. The process of claim 1, wherein the copper, zinc and ferric ion is recovered from the organic phase, and the cobalt and nickel recovered from the aqueous phase.

9. The process of claim 1, wherein the first group of metal ions comprises one metal ion selected from the group consisting of copper, zinc, and ferric ion, and the second group comprises one or both of the metal ions not present in the first group, selected from the group consisting of copper, zinc and ferric ion.

10. The process of claim 1, wherein the first group of metal ions comprises copper, and the second group of metal ions comprises nickel.

11. The process of claim 1, wherein the organic phase separated from the aqueous phase is subjected to scrubbing.

12. The process of claim 11, wherein the scrubbing comprises contacting the organic phase with a scrub solution which is an aqueous process stream recycled from a stripping stage in the process.

13. The process of claim 1, wherein the organophosphinic acid is di-2, 4,4-trimethylpentyl phosphinic acid.

14. The process of claim 1, wherein the hydroxyoxime is of formula (I) or (II):

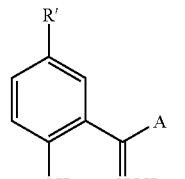

(I)

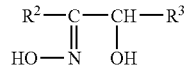

(II)

in which A is a hydrogen atom, a methyl group or an optionally substituted, straight chain, branched or cyclic alkyl or aryl group containing from 2 to 15 carbon atoms.

15. The process of claim 1, wherein the concentration of the phosphinic acid in the organic solution is in the range of from 0.05 to 2.0 M, and the concentration of the hydroxyoxime is in the range 0.01 to 1.0 M.

16. The process of claim 2, wherein the leach solution is a solution that has been subjected to a preliminary aluminum precipitation step to precipitate out aluminum.

17. The process of claim 2 wherein the leach solution is a solution that has been subjected to a preliminary precipitation step to precipitate out aluminum and iron.

18. The process of claim 1, wherein the copper is recovered from the organic phase, and the cobalt and nickel recovered from the aqueous phase.

19. The process of claim 1, wherein the zinc is recovered from the organic phase, and the cobalt and nickel recovered from the aqueous phase.

20. The process of claim 1, wherein the ferric ion is recovered from the organic phase, and the cobalt and nickel recovered from the aqueous phase.

* * * * *